United States Patent [19]
Yoshibe et al.

[11] Patent Number: 5,898,526
[45] Date of Patent: Apr. 27, 1999

[54] LENS BARREL COMPRISING AN ULTRASONIC MOTOR

[75] Inventors: Koshi Yoshibe, Kawasaki; Isao Soshi, Tokyo, both of Japan

[73] Assignee: Nikon Corporation, Tokyo, Japan

[21] Appl. No.: 09/057,539

[22] Filed: Apr. 9, 1998

[30] Foreign Application Priority Data

Apr. 16, 1997 [JP] Japan .................................. 9-113622

[51] Int. Cl.⁶ .............................. G02B 15/14; G02B 7/02
[52] U.S. Cl. ......................... 359/696; 359/823; 359/824
[58] Field of Search .................................. 359/696, 697, 359/698, 704, 823, 824

[56] References Cited

U.S. PATENT DOCUMENTS

| | | | |
|---|---|---|---|
| 4,963,000 | 10/1990 | Kawai | 359/824 |
| 5,708,872 | 1/1998 | Fukino | 396/133 |
| 5,751,502 | 5/1998 | Watanabe | 359/823 |

*Primary Examiner*—Georgia Epps
*Assistant Examiner*—Ricky Mack
*Attorney, Agent, or Firm*—Morgan, Lewis & Bockius LLP

[57] ABSTRACT

A lens barrel comprises a focusing optical system for moving in the direction of the optical axis to perform a focusing operation, an ultrasonic motor used for the automatic focus control, containing a stator and a rotor, and disposed around the optical axis, a motion transformation/transmission mechanism for moving the focusing optical system in the direction of the optical axis on the basis of a rotation of the rotor, a manual operation member to be rotated manually, and a motor holding device for holding the motor to be rotated by a rotation of the manual operation member so as to rotate the rotor, wherein said motor is held on the motor holding device to have the stator and the rotor provided from the light incident side toward the lens barrel in the named order.

4 Claims, 4 Drawing Sheets

LENS BARREL COMPRISING AN ULTRASONIC MOTOR

This application claims the benefit of Japanese Patent Application No. 9-113622 which is hereby incorporated by reference.

BACKGROUND OF THE INVENTION

1. Field of the Invention

The present invention relates to a lens barrel which can be used in an automatic focus control mode and a manual focus control mode, and more particularly, to a lens barrel which is provided with a driving power source to be used in the automatic focus control mode therein.

2. Related Background Art

A conventional lens barrel will be described below with reference to FIG. 3. A lens barrel shown in FIG. 3 is provided with a plurality of photographing lenses, or photographing lens groups L1, L2, L3, L4. Out of these lens groups, the lens group L2 is a focusing optical system which is capable of performing a focusing operation by moving in the direction of the optical axis p. Further, the lens barrel in FIG. 3 is provided with a fixed barrel 1 to which an inner barrel portion 1c is connected, a mount part 2 having a bayonet claw 2a to be mounted on the camera body (not shown), a holding barrel 3 for holding the focusing optical system L2, and a manual operation ring 6.

The holding barrel 3 is provided on the outer peripheral surface of the inner barrel portion 1c so as to be freely rotatable around the optical axis p within a predetermined angular range. A straight advance guide groove 3a is provided on the outer peripheral surface of the holding barrel 3, while a lead cam groove 3b is provided on the inner peripheral surface thereof. The inner barrel portion 1c is provided with a pin 4, and the pin 4 is engaged with the lead cam groove 3b of the holding barrel 3.

Inside the lens barrel, there are provided a holder ring 31 which is rotatably connected to the manual operation ring 6 through a projected portion 6a thereof for mounting an ultrasonic motor block thereon, a stator 35 of an ultrasonic motor which is supported by a support member 33 provided on the holder ring 31, a rotor 37 attached to a rotor support ring 39 which is freely rotatable relative to the holder ring 31 through a bearing 38, and a focusing drive lever 5 which is attached to the rotor support ring 39 to be fitted in the straight advance groove 3a of the holding barrel 3. In addition, on the side of the mount part 2 of the focusing drive lever 5 in the lens barrel, there is provided a printed circuit 9 having a CPU 8, etc.

The manual operation ring 6 is provided in the fore part of the lens barrel (on the light incident side), so as to perform the manual focusing control operation easily. Thus, when the manual operation ring 6 is rotated, the entire ultrasonic motor block containing the holder ring 31 and the focusing drive lever 5 is rotated. When this focusing drive lever 5 is rotated, the holding barrel 3 is rotated around the optical axis p since the front end 5a of the focusing drive lever 5 is engaged with the straight advance groove 3a of the holding barrel 3. When the holding barrel 3 is rotated, the holding barrel 3 itself and the focusing optical system L2 are moved while rotating, in the direction of the optical axis p, to perform the focusing operation.

In the case of the automatic focusing control, the holder ring 31 is not rotated, but the rotor 37 and the rotor support ring 39 are rotated and, like in the case of the manual focusing control, the focusing drive lever 5 is rotated and the focusing optical system L2 is moved, so as to perform the focusing operation.

Next, another conventional lens barrel will be described with reference to FIG. 4. The configuration of a lens barrel shown in FIG. 4 is substantially the same as that of the conventional lens barrel shown in FIG. 3. However, a difference between the two configurations lies in that, since an electric packaged portion including the printed circuit 9 is provided in the fore part, the focusing drive lever 5 is extended toward the light incident side of the lens barrel and is engaged with the straight advance groove 3a of the moving member 3, and a pressing ring 36 is extended to the front of the lens barrel by an extending member 36a so as to pass through above the stator 35 and the rotor 37 to be connected to the manual operation ring 6.

In the Japanese Patent Laid-Open No. Hei 2-253212, there is disclosed a lens barrel which is provided with an ultrasonic motor comprised of a vibrating member, a rotor, and the like, and is capable of automatic focusing control and manual focusing control.

In the conventional lens barrel shown in FIG. 3, there are provided the manual operation ring 6, the rotor 37, the stator 35 and the focusing optical system L2 from the front of the lens barrel in the named order. Also, in the conventional lens barrel shown in FIG. 4, the manual operation ring 6, the focusing optical system L2, the rotor 37, and the stator 35 are provided from the front of the lens barrel in the named order. Accordingly, in the conventional lens barrel shown in FIG. 3, since the rotor 37 is provided at a position sandwiched between the manual operation ring 6 and the stator 35, the focusing drive lever 5 which is attached to the rotor support ring 39 is required to pass through above the stator 35 in order to avoid interference with the holder ring 31 which is rotated by 360 degrees. As a result, the outer diameter of the fixed barrel 1 is required to be large inevitably.

Also, in the conventional lens barrel shown in FIG. 4, the manual operation ring 6, the rotor 37, and the stator 35 are provided from the front of the lens barrel in the named order, so that in order to connect the manual operation ring 6 and the stator 35, it is necessary to pass the extending member 36a through above the rotor 37. Also in this case, the diameter of the fixed barrel becomes large.

As described above, in the conventional lens barrels as shown in FIGS. 3 and 4, since the outer diameter of the fixed barrel becomes large, the operability, external design, etc., of the lens are deteriorated as a result.

Also, in the conventional lens barrel disclosed in the Japanese Patent Laid-Open No. Hei 2-253212, the rotor and the stator are provided in the named order from the front of the lens barrel below the manual operation ring, so that a focusing operation is performed by rotating a lens holder through a rotating ring and rotating barrel provided in the fore part of the lens barrel. In this disposition, the diameter of the fixed barrel is not enlarged, unlike in FIGS. 3 and 4. However, since the manual operation ring is required to be disposed behind the focusing lens groups (on the camera side), such disposition can be realized in a lens system in which the front group movement focusing operation is performed, such as a single focus lens system. However, in a zoom lens system, or the like, of an internal focusing type or a rear focusing type in which a group configuration is complicated owing to the lens performance or the lens size, the manual operation ring must be provided in the hind part of the lens barrel inevitably, which results in deterioration of the operability of the lens barrel. Also, if the manual operation ring is provided in the fore part of the lens barrel, attaching great importance to the operability of a manual focusing, the disposition of the components will be as shown in FIGS. 3 and 4, which results in a large outer diameter of the barrel. Thus, problems such as deterioration of the operability, the external design, etc., of the lens will be brought about.

SUMMARY OF THE INVENTION

The object of the present invention is to provide a lens barrel which can be used in the automatic focus control mode and in the manual focus control mode, the outer diameter of which can be reduced, so that the problems and inconveniences with respect to the operability and external design of the lens barrel can be solved and the deterioration of the lens operability when a manual operation ring is provided in the hind part can be solved.

In order to achieve the above object, according to the present invention, there is provided a lens barrel which comprises a focusing optical system disposed inside an optical system and capable of effecting a focusing operation by moving in the direction of the optical axis, a moving means for moving the focusing optical system in the direction of the optical axis, operation means for effecting a manual focus control operation by driving the moving means through a connection member with an external operation to move the focusing optical system, and driving means for performing an automatic focus control operation by driving the moving means through the connection member to move the focusing optical system, wherein the operation means, the driving means and the moving means are provided from the light incident side of the lens barrel in the direction of the optical axis in the named order so that the output side of the driving means is disposed close to the moving means.

According to the present invention, since the operation means, the driving means and the moving means are provided from the light incident side of the lens barrel in the direction of the optical axis in the named order, the operation means can be arranged to be manually operated to drive the moving means through the driving means and the connection member, a distance between the operation means and the driving means can be reduced, and there is no need to provide an extra space in the direction of the outer diameter of the lens barrel for connecting the operation means and the driving means. As a result, there is no need to enlarge the outer diameter of the lens barrel. Also, since the output side of the driving means for driving the moving means is disposed close to the moving means, the connection member for connecting the driving means to the moving means is not required to be disposed unnecessarily long, and there is no need to provide an extra space in the direction of the outer diameter of the lens barrel for installing the connection member. As a result, there is no need to enlarge the outer diameter of the lens barrel. Also, since the operation member is provided in the fore part of the lens barrel (on the light incident side), the operability is not deteriorated.

Also, the arrangement may be made such that the operation means is connected to the driving means so as to cause the driving means to drive the moving means.

Also, the arrangement may be made such that the driving means is provided with an ultrasonic motor which comprises a stator portion and a rotor portion, and the stator portion and the rotor portion are provided from the light incident side of the lens barrel in the named order. According to this arrangement, the rotor portion side of the ultrasonic motor is disposed to be close to the moving means, the connection member can be disposed to have the shortest distance from the rotor side to the moving means, and there is no need to dispose the connection member to pass through above the stator portion and the rotor portion. As a result, there is no need to enlarge the outer diameter of the lens barrel.

According to the present invention, there is also provided a lens barrel which comprises a focusing optical system for moving in the direction of the optical axis to perform a focusing operation, an ultrasonic motor for automatic focus control disposed around the optical axis and containing a stator and a rotor, a motion transformation/transmission mechanism for moving the focusing optical system in the direction of the optical axis on the basis of a rotation of the rotor, a manual operation member to be rotated manually, and a motor holding device for holding the motor to be rotated by a rotation of the manual operation member so as to rotate the rotor, in which the motor is held on the motor holding device to have the stator and the rotor provided from the light incident side of the lens barrel in the named order.

According to the present invention, it is possible to obtain a lens barrel of a reduced size in which the motion transformation/transmission mechanism can be made compact without deteriorating the operability thereof.

DETAILED DESCRIPTION OF THE PREFERRED EMBODIMENTS

Figure 1:
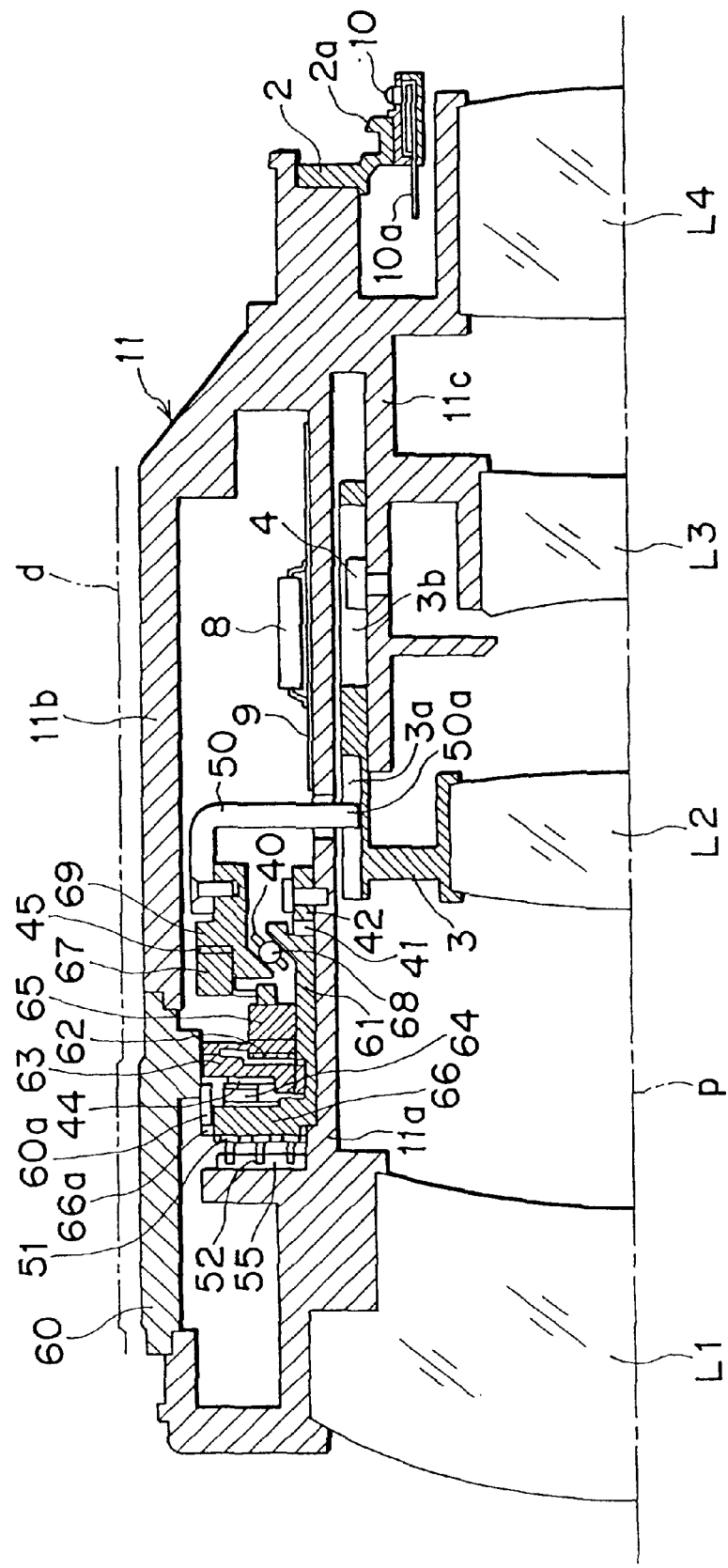
FIG. 1 is a longitudinal cross-sectional view for showing the configuration of a lens barrel according to a first embodiment of the present invention.

In the following, embodiments of the present invention will be described with reference to the accompanying drawings. FIG. 1 is a longitudinal cross-sectional view for showing a lens barrel according to the first embodiment of the present invention. Note that the same referential numerals and symbols are given to the similar components to those in the foregoing conventional examples.

The lens barrel shown in FIG. 1 is provided with photographing optical systems L1, L3, L4, a focusing optical system L2, a fixed barrel 11 consisting of an outer barrel portion 11b, an inner barrel portion 11c and an intermediate barrel portion 11a, a mount part 2 having a bayonet claw 2a to be mounted on the camera body (not shown), a holding barrel 3 for holding the focusing optical system L2, and a manual operation ring 60 to be rotated around the optical axis p.

The photographing optical system L1 is fixed to and held by the inner periphery of the intermediate barrel portion 11a, while the photographing optical systems L3, L4 are fixed to and held by the inner periphery of the inner barrel portion 11c. Further, the focusing optical system L2 is held by the lens holding barrel 3 which is disposed on the outer periphery of the internal barrel 11c. On the outer periphery of the intermediate barrel 11a, there is provided a holder ring 61 which has an ultrasonic motor block mounted thereon.

The internal configuration of the ultrasonic motor block will be described below. A stator 65 of the ultrasonic motor to which a piezoelectric element 62 is attached is mounted on a support member 63. The support member 63 is fitted on the holder ring 61 so as to be rotatable around the optical axis p and movable in the direction of the optical axis together with the holder ring 61.

A rotor 67 of the ultrasonic motor is attached to a rotor support ring 69 through a buffer member 45, and the rotor support ring 69 is disposed on the holder ring 61 to allow free rotation through a bearing 68 which is held by a bearing holding 40.

A pressing ring 66 is thread-engaged to the holder ring 61 in an upright posture relative to the optical axis p. The support member 63 is all the time pressed toward the hind part in the direction of the optical axis p (tothe camera side) by a pressure member 64 which is attached to the pressing ring 66 through a buffer member 44, and the rotor 67 and the stator 65 are brought into frictional contact with pressure by the pressing force generated.

The holder ring 61 is disposed to be freely rotatable around the optical axis p on the outer periphery of the intermediate barrel portion 1a by the pressing ring 42 through a biasing member 41 for biasing the holder ring 61 toward the fore part in the direction of the optical axis p (to the light incident side). The arrangement is made such that, when the automatic focus control is driven, the holder ring 61 itself is not rotated and the rotor 67 and the rotor support ring 69 are rotated instead. Also, a focusing drive lever 50 is directly attached to the rotor support ring 69. As described above, inside the ultrasonic motor block, the focusing drive lever 50, the rotor support ring 69, the buffer member 45, the rotor 67, the stator 65, the support member 63, the buffer member 44, the pressure member 64, and the pressing ring 66 are provided in the named order from the camera side to be mounted on the holder ring 61.

A base plate 51 for a power source for applying electric voltage onto the piezoelectric element 62 is provided on the pressing ring 66 on the fore part side of the lens barrel, and a plurality of ring-shaped conductive portions (omitted in the drawing) are provided on the entire periphery of the power source base plate 51. Since the arrangement is made such that the power brush 52 is contacted to each of the conductive portions in a sliding manner, the entire ultrasonic motor block can be rotated to be brought into electrical contact with the piezoelectric element 62 at any angular position. Note that a through hole is provided in a part of a ring-shaped pattern of the conductive portions, so that the conductive part is connected to the back surface of the power source base plate 51. Thus, an electrical connection is made from the back surface to the piezoelectric element 62 by use of a lead wire, and the like, which are not shown in the drawing. Also, the power brush 52 is fixed to a brush fixing plate 55, and this brush fixing plate 55 is in its turn fixed to the intermediate barrel portion 11a of the fixed barrel 11.

A manual operation ring 60 which enables external manual operation is fitted on the outer barrel portion 11b of the fixed barrel 11 to be freely rotatable. The manual operation ring 60 is disposed in the fore part of the lens barrel (on the light incident side) at which the manual focus control operation can be conducted easily. The manual operation ring 60 has a projected portion 60a on the inner circumference thereof, and this projected portion 60a is directly fitted in a recess 66a of the pressing ring 66. In this manner, when the manual operation ring 60 is rotated, the entire ultrasonic motor block including the holder ring 61 and the focusing drive lever 50 is rotated.

The lens holding barrel 3 for holding the focusing optical system L2 is disposed on the outer periphery of the inner barrel portion 11c to allow free rotation by a predetermined angle only, and a straight advance guide groove 3a is disposed on the outer peripheral portion of the holding barrel 3 while a lead cam groove 3b is disposed on the inner peripheral portion thereof. A pin 4 is disposed on the outer periphery of the inner barrel portion 11c, and this pin 4 is engaged with the lead cam groove 3b of the holding barrel 3. Also, the tip end portion 50a of the focusing drive lever 50 is engaged with the straight advance guide groove 3a of the holding barrel 3 movably in the direction of the optical axis P. When this focusing drive lever 50 is rotated, the holding barrel 3 is also rotated around the optical axis p.

The straight advance groove 3a of the holding barrel 3 is disposed close to the rotor 67 and the rotor support ring 69, so that the focusing drive lever 50 can be arranged to have the shortest length. For this reason, the entire rigidity of the focusing drive lever 50 is preferably enhanced. Also, the focusing drive lever 50 is not necessarily disposed as passed through above the ultrasonic motor block.

Also, a printed circuit 9 to which a CPU 8 and the like are attached is disposed on the outer periphery of the intermediate barrel portion 11a of the fixed barrel 11 and behind the ultrasonic motor block, so as to supply the electric power to the power brush 52. The printed circuit 9 also performs transmission and reception of a signal with the camera body side by use of a connector 10, or the like, which is disposed on the mount part 10 at the rear end portion of the fixed barrel 11 through a lead wire 10a.

An operation of the above-mentioned lens barrel will be described. First, if the focusing control is to be effected manually, when the manual operation ring 60 is rotated, the entire ultrasonic motor block including the holder ring 61 and the focusing drive lever 50 is rotated through the projected portion 60a of the manual operation ring 60 and the recess 66a of the pressing ring 66. By the rotation of the focusing drive lever 50, the holding barrel 3 is also rotated around the optical axis p and, since the pin 4 which is fixed to the inner barrel portion 11c is engaged with the cam groove 3b of the holding barrel 3, the holding barrel 3 is moved in the circumferential direction and also in the direction of the optical axis p. At the same time, the front end portion 50a of the focusing drive lever 50 is moved in the straight advance groove 3a of the holding barrel 3 in the direction of the optical axis p. The focusing optical system L2 held by the holding barrel 3 is moved in the direction of the optical axis p in this manner to effect the focusing operation.

Next, when the automatic focus control is to be effected, if a predetermined signal is transmitted from the camera body side to the CPU 8 of the printed circuit 9 through the connector 10 and the lead wire 10a, the voltage is applied to the piezoelectric element 62 through the conductive portions of the power base plate 51, the lead wire, and the like, so that the rotor 67 which is frictionally contacted with the stator 65 with pressure is rotated, whereby the rotor support ring 69 is rotated together with the focusing drive lever 50. Therefore, the holding barrel 3 is moved in the circumferential direction and also in the direction of the optical axis p, like in the case of the manual focus control, and the focusing optical system L2 which is held by the holding barrel 3 is moved in the direction of the optical axis p to effect the focusing operation.

Figure 3:
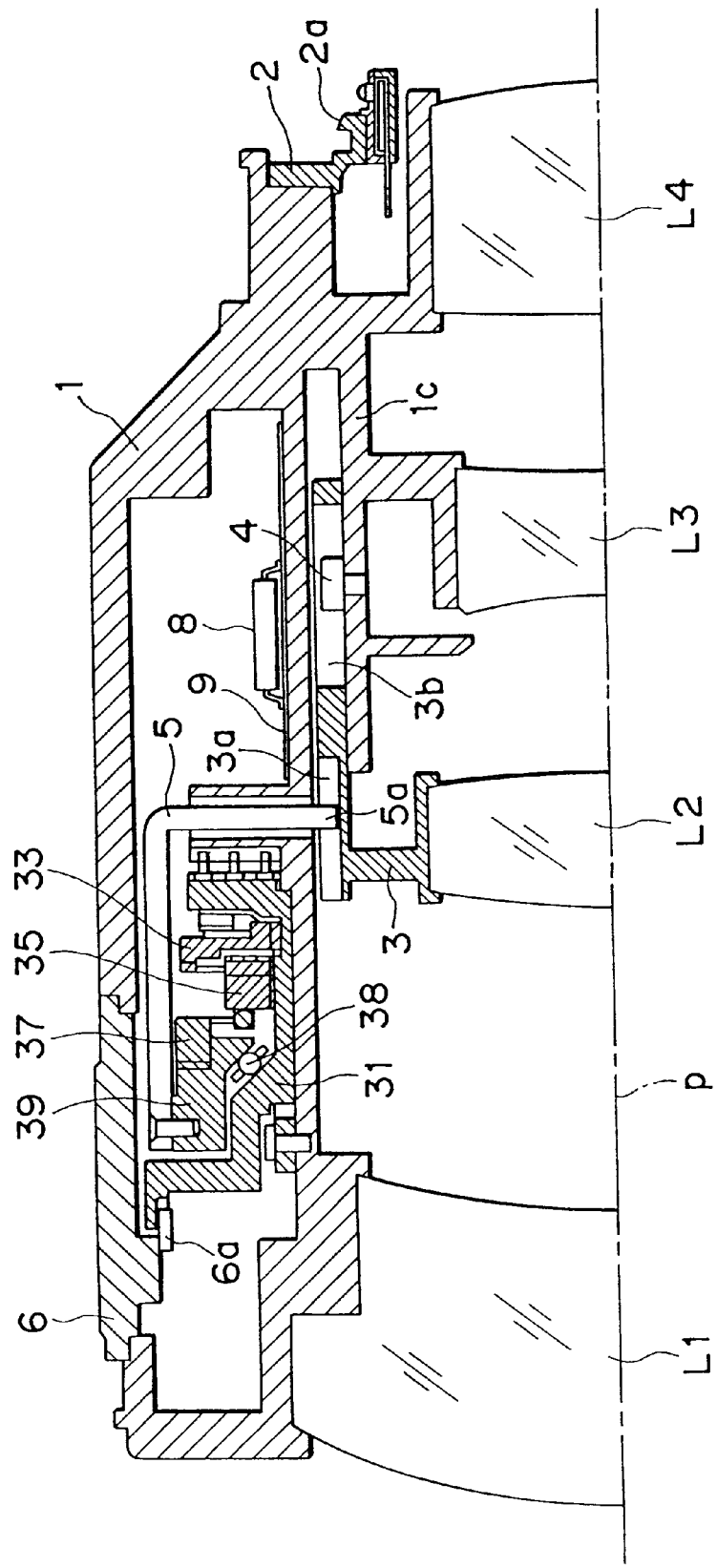
FIG. 3 is a longitudinal cross-sectional view for showing the configuration of a lens barrel according to the prior art.

As described above, according to the lens barrel of the embodiment shown in FIG. 1, the manual operation ring 60, the stator 65 and the rotor 67 are provided from the front of the lens barrel in the named order, and the straight advance groove 3a of the holding barrel 3 is disposed close to the rotor portion 67. As a result, there is no need to dispose the connection member (the focusing drive lever) as passed through above the stator portion and the rotor portion, unlike in the conventional example shown in FIG. 3. For this reason, in the outer diameter of the fixed barrel 11, a space for the connection member is no longer necessary, unlike in the case of the conventional example shown in FIG. 3, so that the fixed barrel can be made compact to that extent, as indicated by a double dotted chain line d in FIG. 1. Also, the operability and the external design, etc., are not deteriorated, unlike in the case where the manual operation ring is disposed in the hind part.

Figure 2:
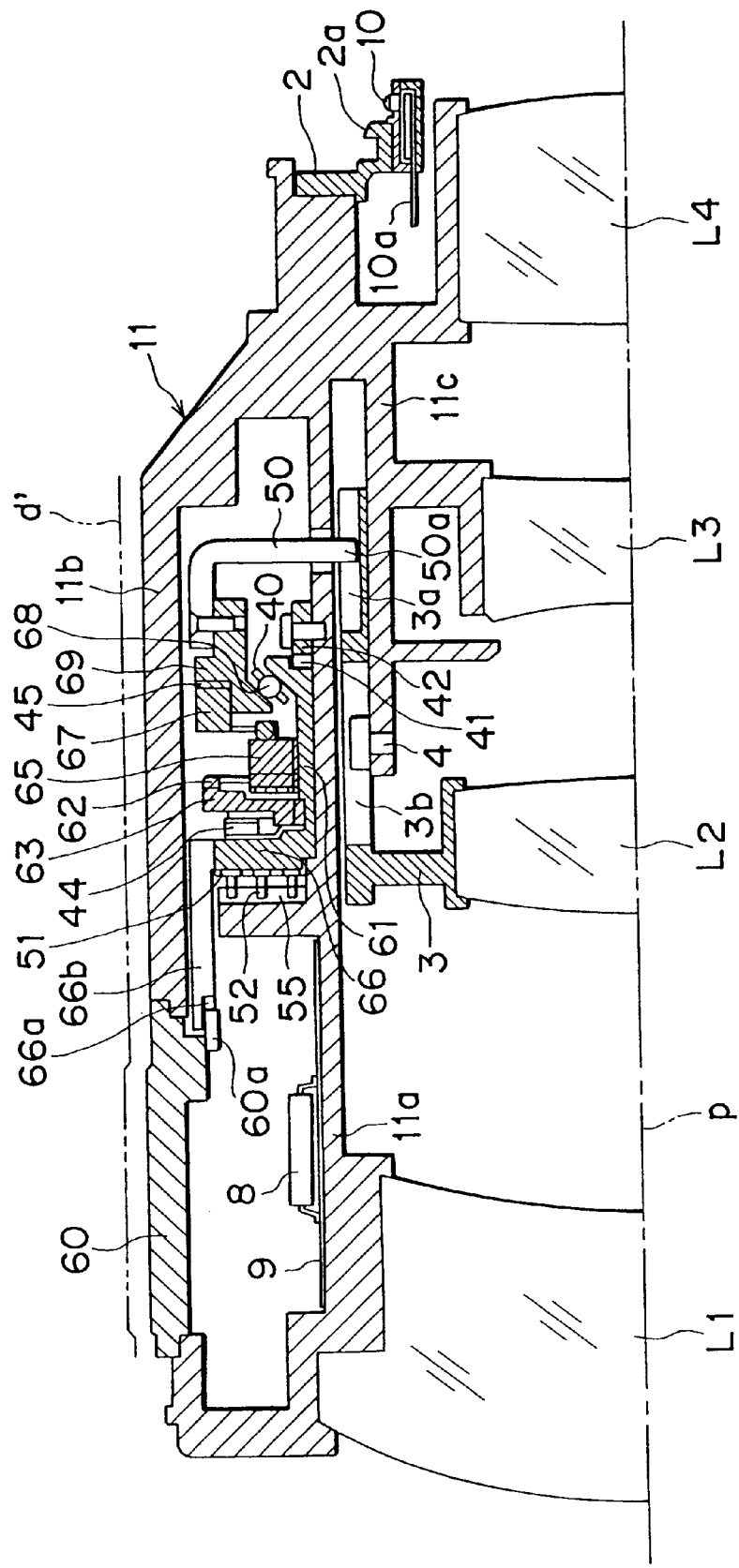
FIG. 2 is a longitudinal cross-sectional view for showing the configuration of a lens barrel according to a second embodiment of the present invention.

Next, the second embodiment of the present invention will be described with reference to FIG. 2. FIG. 2 is a longitudinal cross-sectional view of a lens barrel according to the second embodiment. The configuration of the lens barrel shown in FIG. 2 is basically the same as that of the lens barrel shown in FIG. 1, except that the printed circuit 9 to which the CUP 8 and the like are attached is disposed in the fore part of the lens barrel, and an extending member 66b is disposed between the projected portion 60a of the manual operation ring 60 and the pressing ring 66 to connect them to each other, and the straight advance groove 3a of the holding barrel 3 and the cam groove 3b are disposed reversely in the direction of the optical axis p.

Figure 4:
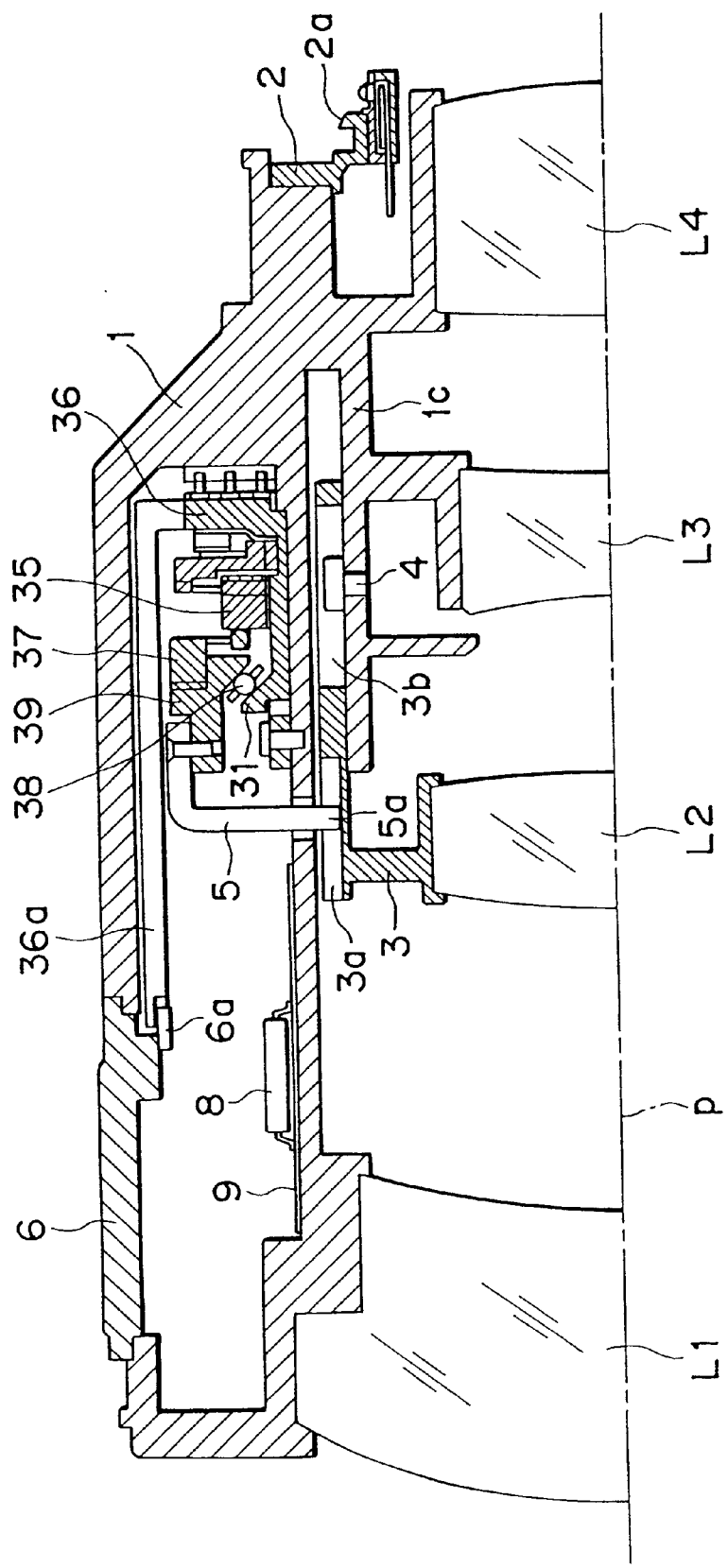
FIG. 4 is a longitudinal cross-sectional view for showing the configuration of another lens barrel according to the prior art.

In the lens barrel shown in FIG. 2, the manual operation ring 60, the stator portion 65, and the rotor portion 67 are provided in the named order from the front of the lens barrel, and the straight advance groove 3a of the holding barrel 3 is disposed close to the rotor portion 67, so that there is no need to dispose the extending member 36a as passed through above the stator portion and the rotor portion, unlike in the conventional example shown in FIG. 4. For this reason, in the outer diameter of the fixed barrel 11, there is no need to provide a space for installing the extending member, unlike in the conventional example shown in FIG. 4, so that the size thereof can be smaller, as compared with the conventional example in FIG. 4, to that extent as indicated by a double dotted chain line d' in FIG. 2. As a result, there arises no problem such as the deteriorated operability or design, unlike in the case where the manual operation ring is disposed in the hind part.

As described above, according to the present embodiments, in the lens barrel of the internal focusing type which can obtain an excellent optical performance by moving the lens groups inside the optical system to effect focusing, there are provided the manual operation ring, the stator portion, and the rotor portion in the named order from the front of the lens barrel, so that there is no need to dispose the connection member and the extending member as passed through above the stator portion and the rotor portion. In such lens barrel of the internal focusing type, the diameters of lenses in the respective optical systems are made smaller gradually from the light incident side toward the camera body side conventionally, so that a rotor having a large diameter is normally disposed in the fore part of the lens barrel and a stator having a small diameter is disposed in the hind part of the lens barrel. However, according to the present invention, such conventional disposition is utterly reversed so that it is possible to reduce the diameter of the lens barrel. For this reason, the outer diameter of the lens barrel can be made smaller than the conventional ones which are indicated by the double dotted chain lines d and d' in FIGS. 1 and 2. As a result, problems such as deteriorated operability and design can be avoided. The deterioration of the operability when the manual operation ring is disposed in the hind part can be also avoided.

According to the present invention, the outer diameter of a lens barrel which can be used in the automatic focus control mode and in the manual focus control mode can be reduced, problems such as deteriorated operability or design of the lens barrel can be avoided, and the deterioration of the operability when a manual operation means is disposed in the hind part can be also avoided.

What is claimed is:

1. A lens barrel comprising:
   a focusing optical system disposed inside an optical system and for effecting a focusing operation by moving in the direction of the optical axis;
   moving means for moving said focusing optical system in the direction of the optical axis;
   operation means for effecting a manual focus control operation by driving said moving means through a connection member with an external operation to move the focusing optical system; and
   driving means for performing an automatic focus control operation by driving said moving means thorough said connection member to move said focusing optical system, being characterized in that;
   said operation means, said driving means, and said moving means are provided from the light incident side of the lens barrel in the direction of the optical axis in the named order so that the output side of said driving means is disposed close to said moving means.

2. A lens barrel according to claim 1, wherein said operation means is connected to said driving means so as to drive said moving means through said driving means.

3. A lens barrel according to claim 1, wherein said driving means comprises an ultrasonic motor having a stator portion and a rotor portion so that said stator portion and said rotor portion are provided from the light incident side of the lens barrel in the named order.

4. A lens barrel comprising:
   a focusing optical system for moving in the direction of the optical axis to perform a focusing operation;
   an ultrasonic motor used for the automatic focus control, containing a stator and a rotor, and disposed around the optical axis;
   a motion transformation/transmission mechanism for moving the focusing optical system in the direction of the optical axis on the basis of a rotation of said rotor;
   a manual operation member to be rotated manually; and
   a motor holding device which holds said motor to be rotated by a rotation of said manual operation member so as to rotate said rotor, being characterized in that;
   said motor is held on said motor holding device to have said stator and said rotor provided from the light incident side toward said lens barrel in the named order.

* * * * *